July 4, 1939.  C. G. KELLER  2,164,772
VEHICLE WHEEL
Filed Feb. 9, 1937  5 Sheets-Sheet 1
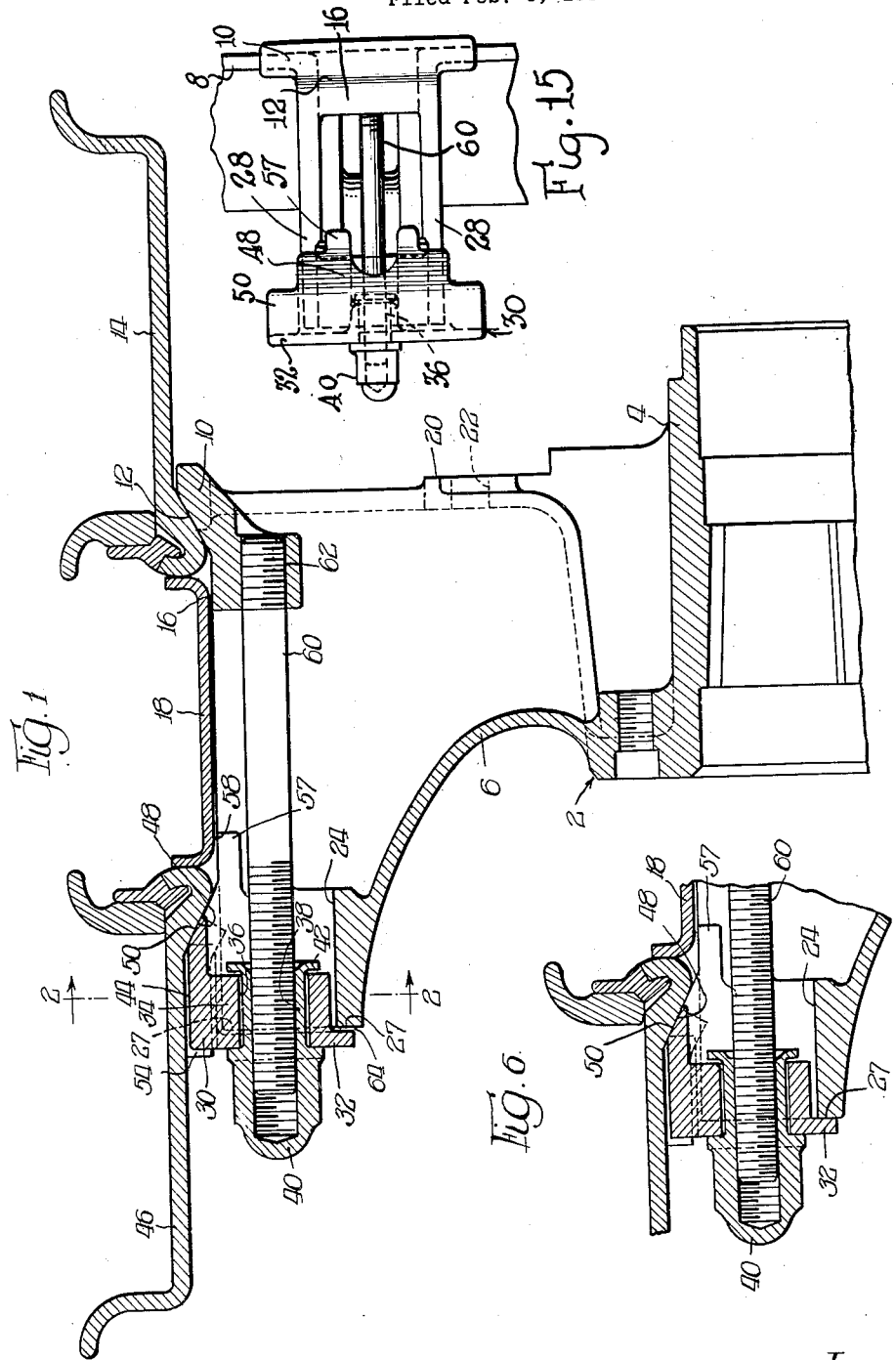
Inventor:
Charles G. Keller,
By [signature] Atty.

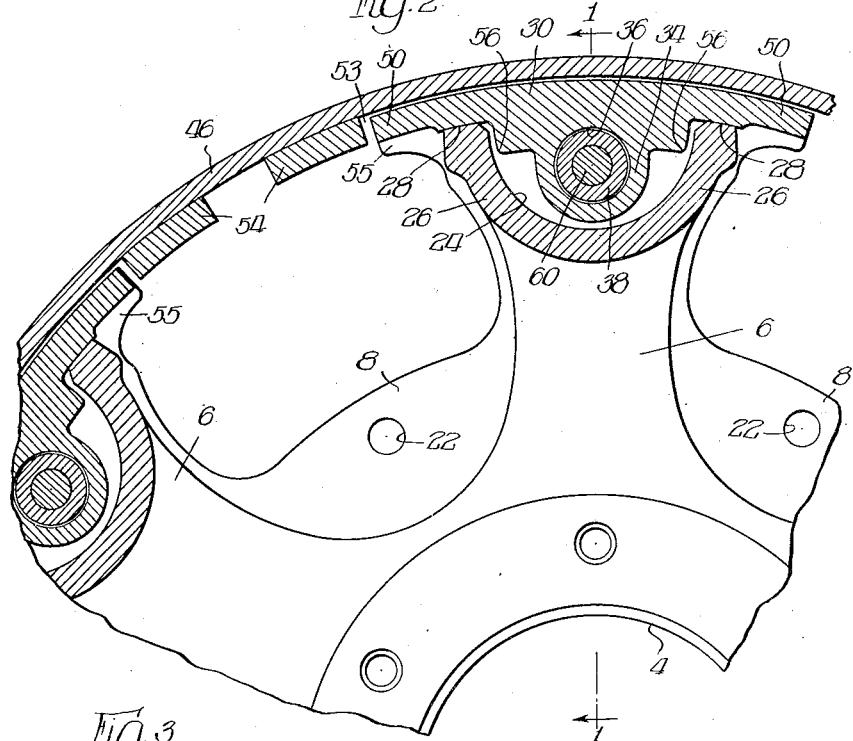
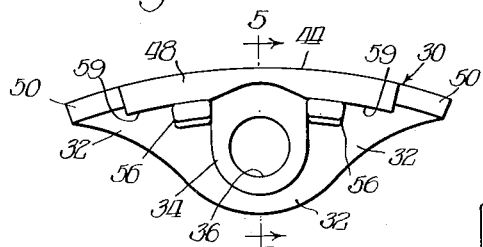
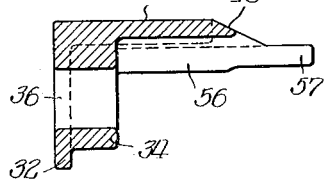
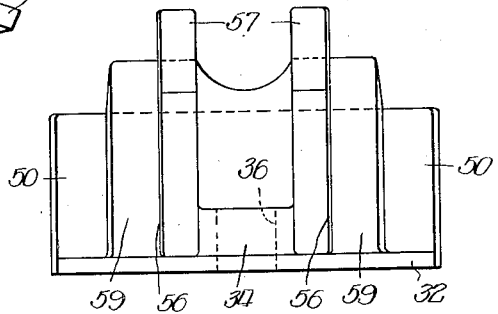

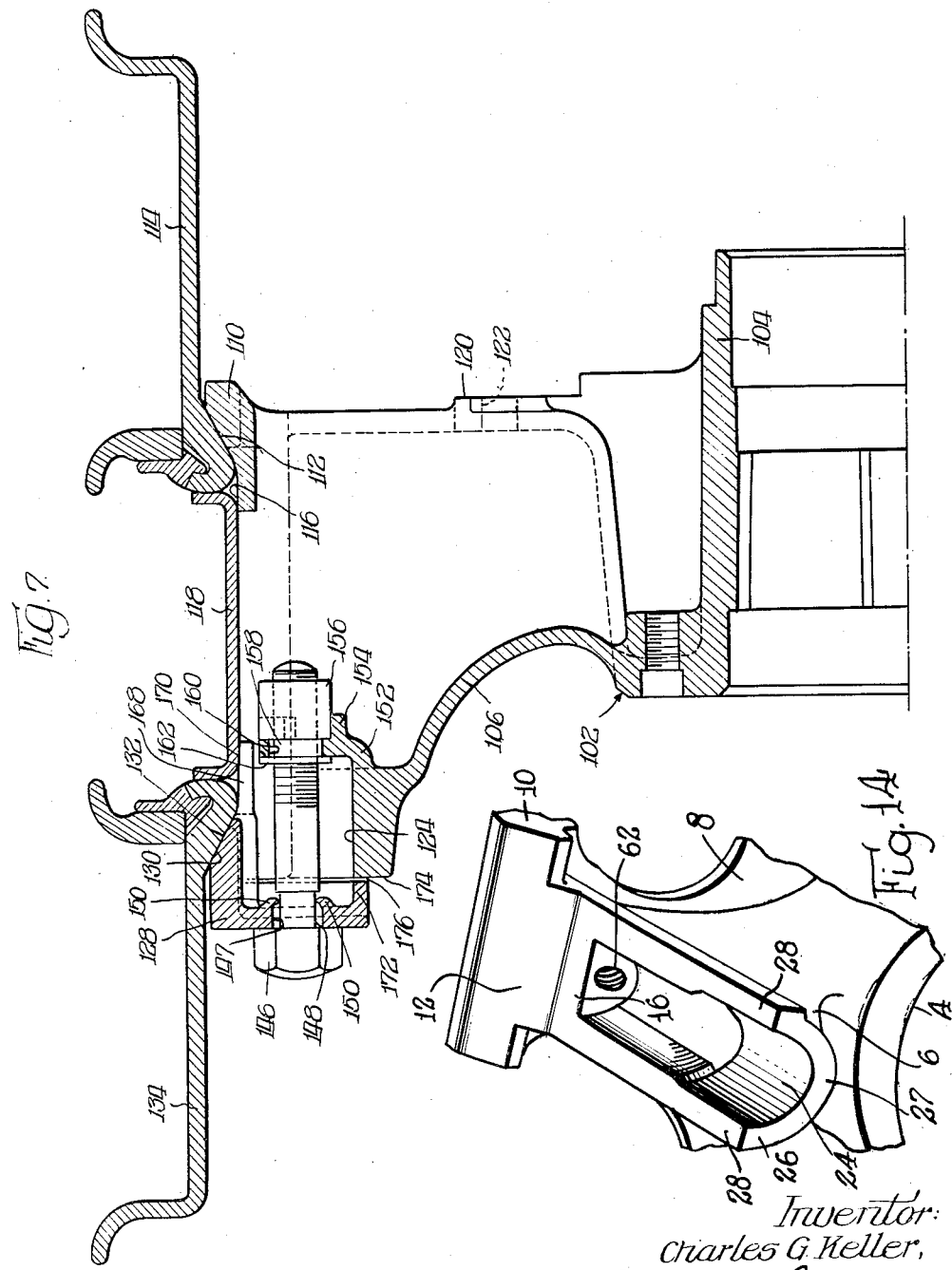

July 4, 1939. C. G. KELLER 2,164,772
VEHICLE WHEEL
Filed Feb. 9, 1937 5 Sheets-Sheet 4

Inventor:
Charles G. Keller,
By Orin O. B. Garner
atty

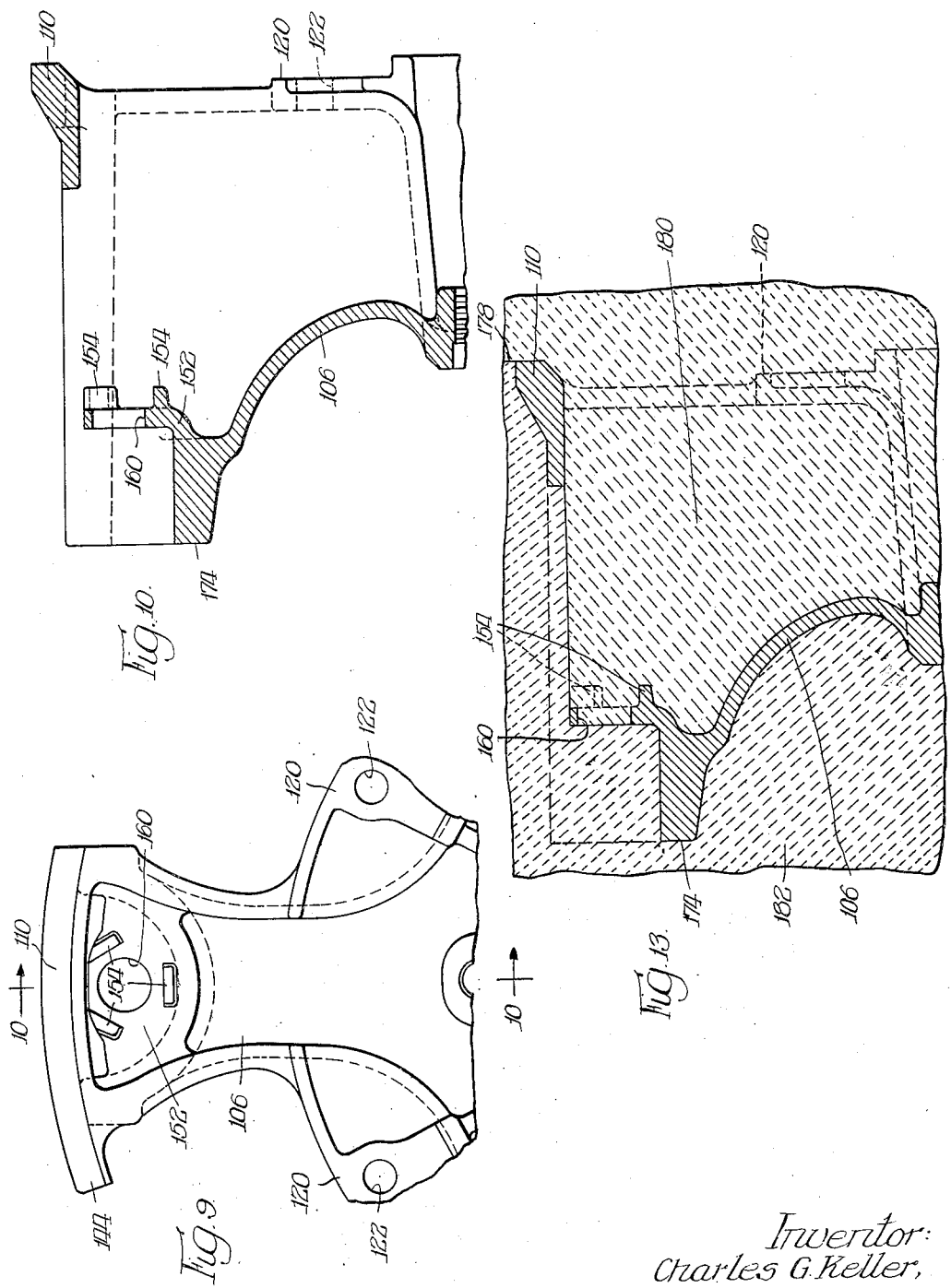
July 4, 1939. C. G. KELLER 2,164,772
VEHICLE WHEEL
Filed Feb. 9, 1937 5 Sheets-Sheet 5
Inventor:
Charles G. Keller,
By Orin O. B. Garner
atty.

Patented July 4, 1939

2,164,772

UNITED STATES PATENT OFFICE 2,164,772

VEHICLE WHEEL

Charles G. Keller, Hyde Park, N. Y.

Application February 9, 1937, Serial No. 124,850

9 Claims. (Cl. 301—13)

This invention relates to vehicle wheels and more particularly to wheels commonly designated as the twin-tire type.

This application is a continuation-in-part of my vehicle wheel application filed in the United States Patent Office on December 22, 1933 and bearing Serial No. 703,534.

In one form of such wheel, hitherto commonly used, the respective spokes have been provided at their radially outer ends with guideways extending transversely of the wheels serving as seats and aligning means for slides or rim clamping members supported therein. These rim clamping members or lugs, as they are sometimes called, are provided with inclined surfaces on their radially outer ends for rim seats and the clamping members or lugs are commonly secured in place by means of bolts extending transversely of the spokes and being fixed to the inboard side of the wheel body so that the lugs are slidable therealong.

In such a construction great accuracy is required in aligning the threaded sockets which receive the inboard ends of the bolts with the grooves or guideways within which the lugs or clamping members are seated. It is apparent of course that if such a structure is to be accurate it is necessary to machine the groove surfaces within which the rim clamping members are seated and, obviously, this is an expensive process.

In another similar wheel construction the guidegrooves or channels within which the slides or lugs are positioned present seating means for said lugs along the radial extremities or ledges of the side walls, said ledges extending transversely of the wheel. When such a seat is provided for the clamping lugs or slide, clearance must be provided between said lug and the channel or groove within which it is positioned. This clearance is objectionable in that it permits the entrance of dirt and water and interferes with the ready adjustment and operation of the parts.

The general object of my invention is to provide a simplified means of attaching wheel rims incorporating therewith convenient dismantling means with a minimum number of parts and such simplicity as will facilitate the manufacture and assembly of the entire wheel.

An object of the present invention is to provide a wheel of the dual-tire type which will overcome the objections above referred to and provide readily adjustable and easily fitted parts.

A further object of my invention is to provide lug securing means for a wheel of the dual-tire type which will obviate the necessity of a long bolt extending transversely of the wheel spoke, and at the same time provide an improved wheel of a design that may be cast entirely in green sand without the use of cores.

A still further object of my invention is to provide a form of clamping means which may abut against the wheel spoke and thus prevent the ingress of dirt and other extraneous matter which interferes with the proper operation of the parts.

A still further object of my invention is to provide a novel form of rim securing means which will overcome present objectionable features above referred to and will be relatively simple and inexpensive to manufacture and will more fully meet the general requirements of varying service conditions.

With these and various other objects in view, my invention may consist of certain novel features of construction and operation as will be more fully described and particularly pointed out in the specification, drawings and claims appended hereto.

In the drawings which illustrate embodiments of the device and wherein like reference characters are used to designate like parts—

Figure 1 is a transverse section through a wheel embodying one form of my invention, the section being taken on a plane bisecting the wheel and substantially in the plane indicated by the line 1—1 of Figure 2;

Figure 2 is a section in the plane of the wheel adjacent the outboard edge thereof and substantially in the plane indicated by the line 2—2 of Figure 1;

Figure 3 is an elevation of the inboard face of the clamping member or lug with the associated hexagonal nut removed.

Figure 4 is a view of the radially inner face of the clamping member shown in Figure 3;

Figure 5 is a transverse section through the clamping member shown in Figures 3 and 4, the section being taken substantially in the plane indicated by the line 5—5 of Figure 3;

Figure 6 is a fragmentary sectional view corresponding in general to the view shown in Figure 1 except that the clamping member is shown in fully seated position;

Figure 7 is a view correspondng in general to the view shown in Figure 1, but showing another embodiment of my invention. The view is sectional bisecting the wheel transversely and substantially in the plane indicated by the line 7—7 of Figure 8;

Figure 9 is a fragmentary elevational view of the spider portion of the wheel structure shown in Figures 7 and 8, the view being taken from the inboard side;

Figure 10 is a section through the spoke shown in Figure 9, the section being taken substantially in the plane indicated by the line 10—10 of Figure 9;

Figure 13 is a fragmentary section through a mold wherein my improved wheel is cast, the section taken through the wheel corresponding to that shown in Figure 10; and Fig. 14 is a perspective view of the spoke ends shown in Figures 1 and 7;

Fig. 15 is a plan view of the lug assembly shown in Fig. 1.

Figure 8:
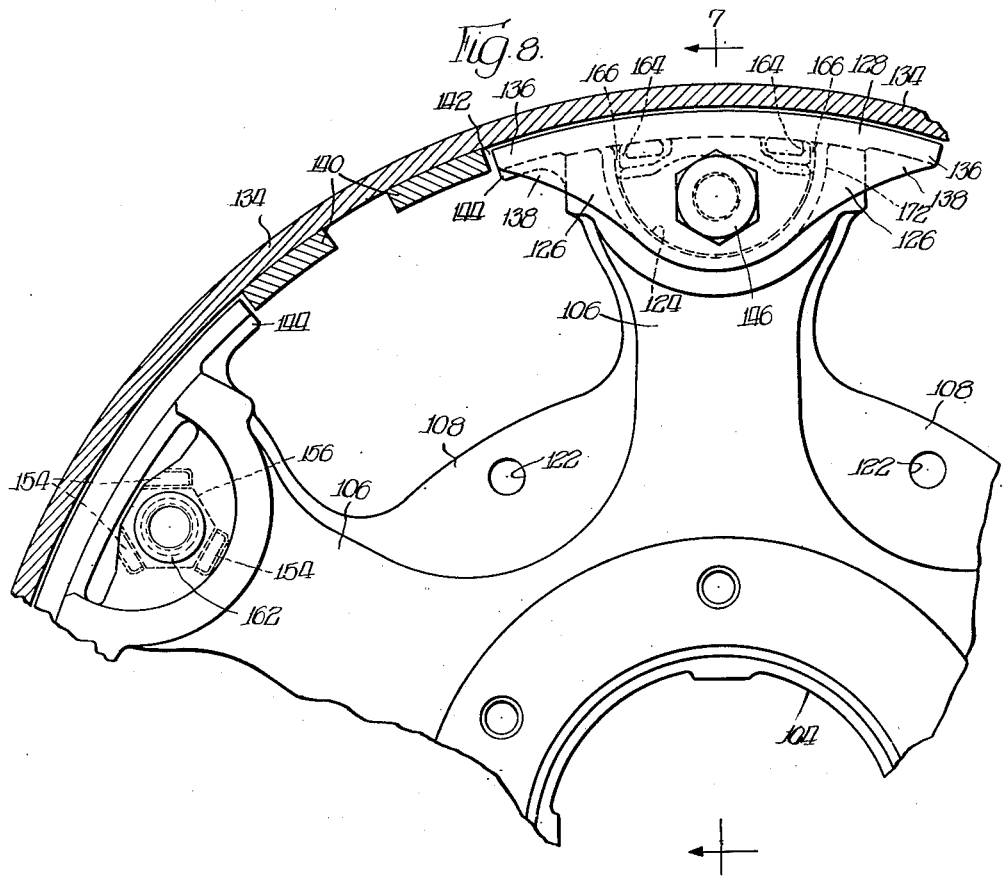
Figure 8 is a fragmentary elevational view, partly in section, from the outboard side of the wheel structure shown in Figure 7 and showing two spokes, the section being taken through the outboard rim in a plane parallel to the plane of the wheel and adjacent the rim seat. The spoke at the left is shown with the clamping lug assembly removed.
Figure 11:
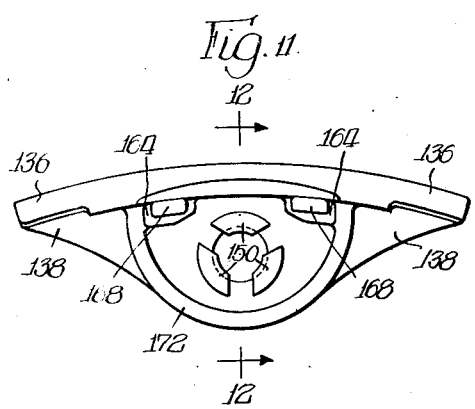
Figure 11 is an elevational view from the inboard side of the rim clamping member used in the wheel structure shown in Figures 7 and 8.
Figure 12:
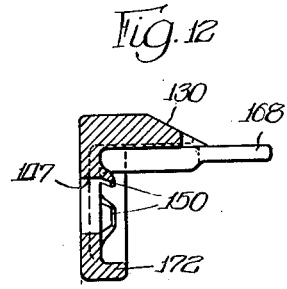
Figure 12 is a tranverse section through the clamping member shown in Figure 11, the section being taken substantially in the plane indicated by the line 12—12 of Figure 11.

Referring more particularly to the embodiment of my invention shown in Figures 1 to 6 inclusive, the twin-tire type wheel generally designated 2 has the hub 4 and the plurality of integrally cast spokes 6. The wheel is of the fellyless type, the hub and spoke construction being of the general form more particularly described in my previous Patents No. 1,827,790 and No. 1,827,793, issued October 20, 1931, and particularly arranged for adequate circulation of air, facilitating cooling. In this hub and spoke structure the spokes are generally U-shape in cross section with the edges of the side walls theroef connected by webs 8 (Figure 2). The spaced walls of each spoke are connected at their inboard sides by a bridge piece 10 presenting an inclined surface or bevel 12 forming a seat for an inboard rim 14. In an outward direction from said seating position 12 the spokes present peripherally aligned surfaces 16 upon which may be seated an annular spacer member 18 fixing the relative position of the two rims. The inner faces of the spokes present in one plane aligned surfaces 20 upon which may be mounted the usual brake drum (not shown), said drum being secured thereto by any convenient means as bolts passing through the apertures 22 in the walls thereof. At the radially outer end of each spoke and at the outboard side thereof is provided a guide-way or channel 24 having the side walls 26, 26 (Figure 2) terminating at their radially outer edges in ledges or surfaces 28 providing seating means for the clamping lugs or slides 30. The ledges 28, 28 extend along the length of the walls 26, 26 and are slightly convex in form to conform to the arc of a circlec whose center is at the wheel axis. The outboard end of each spoke 6 terminates in a surface 27 (Figure 1), said surface lying in a plane perpendicular to the axis of the wheel and comprising also the outboard edges of the walls 26, 26. This outboard face of each spoke is thus somewhat semi-circular in form and provides a seat against which may abut the outer flange 32 of the clamping lug 30. As is most clearly apparent in Figures 3 to 5, inclusive, the clamping lug 30 has a body portion 34, generally cylindrical in form, with a center opening 36 therethrough within which may be loosely received the shank 38 of the nut 40, the inboard end of said shank being flanged over as at 42, thus securing the nut 40 to the body portion 34 of the clamping lug 30 in such a manner as to permit its rotation therein.

The clamping member 30 presents an outer surface 44, generally concentric with the wheel rim 46, and provides therefor a seat in the form of the inclined surface 48, said surface abutting against the complementary seating surface 49 formed on said outer rim 46. The clamping member 30 has the lateral flanges or ears 50, 50 at opposite sides thereof reinforced by the outer flange 32 (Figure 3) integrally joining said flanges or ears 50 with the body portion 34, said ears being adapted to have close proximity as at 53 to the driving lugs 54 secured to said outer rim 46 in any convenient manner. Similarly, ledges 55 formed on the inboard sides of the spoke likewise are arranged to be fitted in close proximity to similar driving lugs correspondingly fixed on the inboard rim. Adjacent the body portion 34 and along the opposite sides thereof are provided the ledges or shoulders 56, 56 which are fitted closely within the opposite walls 26, 26 and serve as a driving abutment between the clamping member 30 and the adjacent spoke. The said ledges or shoulders 56 are extended in an inboard direction as at 57 to have abutment as at 58 (Figure 1) with the inner perimeter of the spacer ring 18, said abutment serving to prevent the tilting of the clamping member 30 in assembly.

It will be apparent that by the use of varying widths of annular spacer members 18 I may provide for various sizes of tires to be mounted upon a given wheel body. With each width of spacer ring 18, however, there must be associated its complementary clamping member 30 inasmuch as the position of the outboard rim seat 48 is shifted inboard or outboard to accommodate a particular width of spacer. It is therefore necessary for each spacer to have its associated clamping member in order that said clamping member may provide a proper seat for the outboard rim and at the same time have its outer flange seated upon the face 27 at the outboard extremity of the spoke when the parts are tightly assembled.

It will be noted that the surface of the groove 24 within which the clamping member 30 is received is free of engagement with said clamping member, the fit between the spoke and said clamping member being determined by abutment between the ledges 28 at the extreme radial ends of the spokes and complementary surfaces provided on the radially inner faces of said clamping members as at 59.

The bridge 10 carries the clamping bolt 60 which is threaded therein with a drive fit as at 62 in order to prevent its disengagement when the rims are dismantled. The clamping bolt 60 extends lengthwise through the aligned groove 24 at the outboard side of the spoke. In assembly the outboard end of the clamping bolt 60 is received within the shank 38 of the nut 40 and is threaded therein with a running fit which will permit its ready removal. It will be apparent, therefore, that as the nut 40 is turned upon the clamping bolt 60 the clamping member 30 will slide inwardly or outwardly upon said bolt. The clamping member may thus force the outer rim 46 tightly into engagement with the spacer member 18 and firmly seat the rim 14 upon the seat 12 and likewise the rim 46 upon the seat 48. It will be further noted that when the nut 40 has been threaded upon the clamping bolt 60 until both the inboard rim and the outboard rim have been firmly seated in their respective positions, a slight clearance is still provided as at 64 between the outer flange 32 of the clamping member 30 and the extreme outboard face 27 on the spoke. Such clearance, however, is objectionable in that it permits the accumulation of dirt and other extraneous matter which interferes with the proper operation of the parts. Accordingly, I have so designed the various parts involved in this clamping operation that the amount of clearance as indicated at 64 when the parts have been tightly fitted will be so little as to permit the further tightening of the nuts 40 upon the clamping bolt 60 until the outer flange 32 is brought fully into abutment against the face 27 on the end of the spoke. Figure 6 shows the parts in fully abutting position. In this last mentioned operation some slight distortion of the rim occurs and this distortion will be compensated for in the pneumatic tire mounted thereon.

By this arrangement in combination with my special hub and spoke design as previously mentioned, I have provided air circulation and at the same time prevented ingress of extraneous matter which might interfere with proper functioning of parts which must be operable for the assembling and dismantling of rims and tire.

Describing in more detail the embodiment of my invention shown in Figures 7 to 13, inclusive, the wheel generally designated 102 has the hub portion 104 and spokes 106, 106 generally U-shaped in section with the edges of adjacent side walls connected by an integrally formed web 108 (Figure 8). Joining the spaced walls of each spoke on the inboard side is the bridge member 110 integrally formed therewith and presenting on its outer perimeter and outboard face the seat 112 for the inboard rim 114. The bridge 110 likewise presents a peripheral surface 116 concentric with the hub of the wheel upon which may be seated one edge of the annular spacer member 118.

Inboard, the spokes are provided with aligned surfaces 120 in a plane parallel to the plane of the wheel upon which may be mounted in the usual manner a brake drum (not shown) as by means of bolts or other convenient securing means passing through the openings 122 provided therefor in the respective spokes.

At the radially outward end and at the outboard side of each spoke is provided the semi-cylindrical channel or groove 124 with opposite walls 126, 126 (Figure 8) within which may be positioned the clamping lug and bolt assembly 128, said clamping lug presenting an inwardly sloping peripheral face 130 upon which may be seated the complementary face 132 provided on the inner periphery of the outboard rim 134. The clamping lug has the projecting ears 136, 136 reinforced by the integrally formed webs 138, 138 (Figure 11), said projecting ears, in assembly, having close proximity to the driving lugs 140, 140 secured in position by any convenient means on the outboard rim 134. light clearance is provided between the driving lugs 140 and the ears 136 as shown at 142 for convenience of assembling and dismantling. Similarly, on the inboard side of the spoke may be integrally formed therewith a drive lug 144 designed to have close proximity to driving lugs (not shown) similarly secured on the inboard rim 114. Associated with the clamp lug is the bolt 146, the shank of said bolt passing through the opening 147 and having a short portion of diminished diameter immediately adjacent the head thereof forming an annular channel around said shank as at 148, and within said channel are received the ends of the retaining lugs 150 which are loosely riveted over in order to retain said bolt in assembly with said clamping lug.

At the inboard end of the channel portion 124 is the radial wall 152 integrally formed with the spoke 106 and having formed thereon the clamp nut fingers 154 serving to prevent rotation of the clamp nut 156. The nut 156 has a neck or sleeve extension 158 which is seated within the opening 160 formed in the wall 152 and riveted over as at 162 thereby loosely retaining the nut 156 in assembly with said wall.

The clamping lug has the ledges or shoulders 164, 164 (Figure 11) at the opposite side thereof and in close proximity with the inner faces of the walls 126, 126 (Figure 8) in order to provide driving engagement therewith, the slight spacing therebetween as shown at 166, 166 being provided for purposes of tolerance. The ledges 164, 164 extend in an inboard direction to form the projecting portions 168, 168, said projecting portions having engagement as at 170 (Figure 7) with the inner periphery of the spacer 118 and being prevented thereby from skewing out of position as the clamping bolt 146 is drawn tight.

The clamping lug has the annular flange 172 (Figure 11) designed to have cooperative engagement with the outboard face 174 formed at the outboard extremity of each spoke and defining the outboard edges of the walls 126, 126 of the channel portion 124.

It will be apparent that as the clamping bolt 146 is rotated in the nut 156 the clamping lug assembly as a whole will be moved in an inboard or outboard direction since the nut 156 is secured to the wall 152 and held against rotation. Figure 7 shows the position assumed by the various parts of the wheel assembly when the clamping lug has been drawn up tight with the outboard rim firmly in position on the seats 130, 130 and the inboard rim likewise tightly fitted against the seats 112, 112. I have so designed my wheel structure that when the parts are so drawn up there will remain a slight clearance as shown at 176 between the clamping lug flange 172 and the outboard face 174 on the spoke. Inasmuch as clearance at this point is objectionable, since it permits the ingress of dirt and other extraneous matter which interferes with operation of the parts, I have so designed this wheel that after the parts have been drawn into tight engagement it is possible to further rotate the clamping bolts 146, 146 and distort the rim sufficiently to permit engagement between said annular flanges 172 and the adjacent faces 174.

Figure 13 shows a fragmentary sectional view through a foundry mold wherein may be cast the spider of my novel design of wheel as shown in Figures 7 and 8. I have shown as at 178 the parting line of the mold, that is, the dividing line between the drag or bottom half thereof and the cope or top half thereof. From an inspection of Figures 7 and 13 it will be apparent to one skilled in the art that I have provided a hub and spoke structure which may be cast in a mold of green sand without the use of cores, the drag half of the mold indicated at 180 being readily separable from the cope portion thereof indicated at 182.

From a consideration of the wheel shown in Figures 1 to 6 it is clear that I have designed a structure wherein it is possible to use the long clamping bolt and at the same time secure proper alignment between such a bolt and the associated clamping lug at the outboard side of the spoke. I have accomplished this while at the same time eliminating machining, heretofore found necessary. Along with this feature I have provided an arrangement whereby the clamping lug is fitted tightly against the outboard edge of the spoke and thus preventing the ingress of dirt, water and other extraneous matter.

In the modification of my invention shown in Figures 7 to 13, inclusive, I have likewise illustrated a novel structure wherein proper alignment of the clamping lugs is secured without any machining of parts within which they are fitted and at the same time I have secured a tight fit between said clamping lugs and the outboard edges of the associated spoke as in the case of the embodiment previously mentioned.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a wheel of the class described a central spider member including spaced spokes of U-shaped cross section, bridge members joining the spaced walls of said spokes respectively adjacent their inboard edges and presenting peripherally aligned wedge faces forming an inboard rim seat, an inboard rim seated thereon, a spacer, each of said spokes having a semi-cylindrical socket adjacent its radially outboard edge, said socket comprising side walls presenting axially extending ledges and an end wall, threaded means secured on said end wall, a clamping member supported on the ledges of each of said sockets and movable therealong into rim clamping position, said clamping member comprising a bolt rotatable therein and received within said threaded means, said clamping members presenting peripherally aligned wedge faces forming a seat for an outboard rim, and an outboard rim seated thereon, each of said clamping members comprising means projecting in an inboard direction for engagement with the inner periphery of said spacer.

2. In a wheel of the class described a central spider member including spaced spokes of U-shape cross section, bridge members joining the spaced walls of said spokes respectively adjacent their inboard edges and presenting peripherally aligned wedge faces forming an inboard rim seat, an inboard rim seated thereon, a spacer, each of said spokes having a semi-cylindrical socket adjacent its radially outboard edge, said socket comprising side walls presenting axially extending ledges and an end wall, threaded means secured on said end wall, a clamping member supported on the ledges of each of said sockets and movable therealong into rim clamping position, said clamping member comprising a bolt rotatable therein and received within said threaded means, said clamping members presenting peripherally aligned wedge faces forming a seat for an outboard rim, and an outboard rim seated thereon, each of said clamping members comprising means designed to abut with the outboard edges of said walls after distortion of said outboard rim.

3. In a wheel of the class described a spider having a spoke of U-shaped cross section presenting on its inboard side a fixed wedge rim seat, an inboard rim seated thereon, a spacer, said spoke having at its outboard side a U-shaped socket having an inboard wall in the plane of the wheel, side walls presenting axially extending ledges and a U-shaped outboard face, threaded means on said inboard wall, and a clamp lug assembly having a bolt secured in said threaded means whereby said assembly may be moved into fully clamped position, said assembly having a wedge face forming an outboard rim seat, an outboard rim seated thereon, said assembly having skew-preventing means underlying said spacer and other means designed to abut said U-shaped face by distortion of the rim seated thereon after the parts are in fully clamped position.

4. In a wheel of the class described a central spider having a spoke of U-shaped cross section with a fixed rim seat at its inboard side and presenting at its outboard side a U-shaped socket defined by axially extending walls terminating in ledges at the outboard periphery of said spoke, said socket having an inboard wall with threaded means therein and an outboard face, a clamping lug slidably seated on said ledges, means on said clamping lug for abutment against said axially extending walls and extending in an inboard direction to overlie said inboard wall and underlie an associated spacer, said clamping lug having a transverse opening, a clamp screw rotatably fixed in said opening and having threaded engagement with said threaded means for moving said clamping lug into fully clamped position.

5. In a wheel of the class described a spider having a spoke of U-shaped cross section with a fixed inboard rim seat and presenting at its outboard side a U-shaped socket with axially extending ledges, an inboard wall and a U-shaped outboard face, threaded means on said inboard wall, a clamping lug slidably seated on said ledges and presenting skew-preventive means overlying said inboard wall, an axially extending opening in said lug and a clamp bolt rotatably secured therein, the opposite end of said clamp bolt having threaded engagement with said threaded means for moving said clamping lug into and out of clamping position.

6. In a wheel of the class described a spider having a spoke of U-shaped cross section with a fixed inboard rim seat and presenting at its outboard side a U-shaped socket with axially extending ledges, an inboard wall and an outboard face, threaded means on said inboard wall, a clamping lug slidably seated on said ledges and presenting skew-preventive means overlying said inboard wall, an axially extending opening in said lug and a clamp bolt rotatably secured therein, the opposite end of said clamp bolt having threaded engagement with said threaded means for moving said clamping lug into and out of clamping position, and means on said lug for abutment against said outboard face after the parts have assumed fully clamped position.

7. In a wheel of the class described a central spider having a spoke of U-shaped cross section with a fixed rim seat at its inboard side and presenting at its outboard side a U-shaped socket defined by axially extending walls terminating in ledges at the outboard periphery of said spoke, said socket having an inboard wall with threaded means therein and an outboard face, a clamping lug slidably seated on said ledges, stop means on said clamping lug for abutment against said axially extending walls and extending in an inboard direction to overlie said inboard wall and underlie an associated spacer, said clamping lug having an axially extending opening, a clamp screw rotatably fixed in said opening and having threaded engagement with said threaded means for moving said clamping lug into fully clamped position, and means on said clamped lug designed to abut said outboard face after the parts have assumed fully clamped position.

8. In a wheel of the class described a central spider having a spoke of U-shaped cross section with a fixed rim seat at its inboard side and presenting at its outboard side a U-shaped socket defined by axially extending walls terminating in ledges at the outboard periphery of said spoke, said socket having an inboard wall with threaded means therein and an outboard face, a clamping lug slidably seated on said ledges, means on said clamping lug for abutment against said axially extending walls and extending in an inboard direction to overlie said inboard wall and underlie an associated spacer, and securing means for said clamping lug.

9. In a dual demountable rim wheel a central member having a spoke of U-shaped section presenting at its inboard side a fixed rim seat, an inboard rim seated thereon, a spacer seat adjacent said rim seat, a spacer seated thereon, said spoke presenting at its outboard side a U-shaped socket defined by walls presenting axially extending ledges, an inboard wall having threaded means, and an outboard face, and a clamping lug slidably and adjustably secured on said ledges and presenting an outboard rim seat, and an outboard rim seated thereon, said clamping lug having skew-preventive means underlying said spacer and overlying said inboard wall.

CHARLES G. KELLER.